| United States Patent [19] | [11] 3,948,874 |
|---|---|
| Palmqvist | [45] Apr. 6, 1976 |

[54] METHOD FOR REMOVING LIGNIN FROM TALL OIL

[75] Inventor: Fredrik Teodor Emanuel Palmqvist, Solna, Sweden

[73] Assignee: Alfa-Laval AB, Tumba, Sweden

[22] Filed: Apr. 8, 1974

[21] Appl. No.: 458,694

[30] Foreign Application Priority Data
May 7, 1973  Sweden.......................... 7306345

[52] U.S. Cl................................ 260/97.7; 260/97.5
[51] Int. Cl.² ........................................... C09F 1/00
[58] Field of Search......................... 260/97.7, 97.5

[56] References Cited
UNITED STATES PATENTS

| 931,608 | 8/1909 | Hough | 260/97.7 |
|---|---|---|---|
| 949,324 | 2/1910 | Hough | 260/97.7 |
| 2,143,345 | 1/1939 | Frankel | 260/97.7 |
| 2,227,203 | 12/1940 | Scott | 260/97.7 |

*Primary Examiner*—Donald E. Czaja
*Assistant Examiner*—William E. Parker
*Attorney, Agent, or Firm*—Cyrus S. Hapgood

[57] ABSTRACT

Tall oil obtained by splitting sulphate soap with an acid, and which still contains acid splitting liquid residues after removal of splitting liquid, is subjected to a lignin-removing operation by drying the tall oil to free it from an additional quantity of splitting liquid, and thereafter separating lignin in solid form, together with an acid residue of salt crystals, from the tall oil thus dried.

2 Claims, 1 Drawing Figure

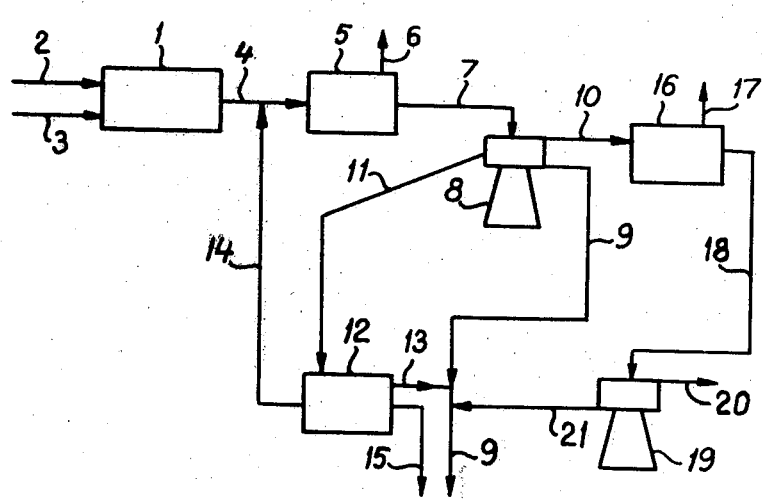

METHOD FOR REMOVING LIGNIN FROM TALL OIL

The present invention relates to a method for removing lignin from tall oil which has been obtained by splitting sulphate soap with an acid (normally sulphuric acid) and which, after removal of splitting liquid (water phase), still contains acid splitting liquid residues.

In continuously operating systems previously used for splitting sulphate soap, the splitting liquid is separated from the tall oil by centrifuging; but this takes place incompletely in that the centrifuged tall oil will contain 2 to 3% by weight of water. To be suitable for further treatment, the tall oil is allowed to have a maximum water percentage of 1.5% by weight. Remaining water is therfore separated off by gravity settling in large tanks for a period of 48 hours at a temperature of about 80° C. During the long period for separating at a high temperature, poly-unsaturated (drying) fatty acids present in the tall oil are oxidized, and for this reason the quality of the oil is impaired. In order to enable use of the tall oil for the manufacture of paint, varnish or soap, it is distilled. Lignin remaining in the tall oil is thus precipitated on the surfaces of the distilling apparatus, so that these surfaces must be cleaned from time to time in order to keep the distilling apparatus capable of operating. The cleaning operations are time-consuming and laborious and require interruptions of the operation.

According to the present invention, the tall oil obtained after the aforementioned removal of the splitting liquid, instead of being subjected to said gravity settling, is freed from an additional quantity of splitting liquid by being dried, whereupon lignin is separated in solid form, together with an acid residue of salt crystals, from the oil thus dried. The lastmentioned separation is effected to advantage by filtering or centrifuging. The drying can be effected by spraying the tall oil into a drying tower or by blowing an inert gas, such as carbon dioxide or nitrogen gas, through the tall oil at a suitably high temperature, such as 90° to 95° C.

This method has the advantage that the removal of the water from the tall oil can take place practically completely. Also, due to the drying, the acidity of the splitting liquid present in the tall oil increases, which leads to a practically complete preciptitation of the lignin from the tall oil. Thus, the lignin can be separated effectively from the tall oil, and said difficulties with its distillation can be reduced substantially.

The course of the precipitation of the lignin is as follow: The lignin is present in the tall oil very finely distributed (colloidally or finely dispersed). Thus, it is in such a form that it cannot be separated off by means of centrifugal separators operating with a strong field of centrifugal force. Owing to the fact that the residues of the water phase remaining in the oil are concentrated, the acidity of the water phase is increased. The result of this is that the finely distributed lignin starts flocculating. When the water has been practically completely removed from the oil, this flocculation has proceeded so far that flocs and aggregates of the lignin, easy to separate, are obtained. During the time when the removal of the water takes place, the sodium sulphate content in the splitting liquid is precipitated as separable salt crystals.

Due to the effective separation of the lignin from the tall oil, the latter acquires a desired light color. Moreover, if the drying of the tall oil according to the invention is carried out by vacuum evaporation, which preferably takes place at a temperature of 90° to 95° C, oxidation of the unsaturated fatty acids of the tall oil is avoided to a high degree, which circumstance also increases the quality of the tall oil.

The invention is described more in detail below, reference being made to the accompanying drawing in which the single illustration is a flow diagram of a continuously operating system, chosen by way of example, for carrying out the present method. The percent values stated in the following are % by weight.

In the drawing, the system comprises a splitting plant 1 to which warmed-up sulphate soap and 35% sulphuric acid are supplied through lines 2 and 3, respectively. A temperature of abour 95° C prevails in the splitting plant 1. The splitting mass is led through a pipeline 4 from the splitting plant 1 to a degassing tank 5. Gases such as hydrogen sulphide leave tank 5 at atmospheric pressure through a ventilation tube 6. The degassed mass flows through a pipeline 7 to a self-opening centrifuge 8, which intermittently discharges centrifugally separated lignin through an outlet 9. Separated tall oil discharges via an overflow outlet 10, and separated splitting liquid discharges via an overflow outlet 11 and is led to a sedimentation tank 12. In the latter, a lignin phase of light weight is separated off and discharges via an overflow outlet 13. A part of the splitting liquid is returned to the inlet of the degassing tank 5 through a pipeline 14 so as to dilute and thus reduce the viscosity of the splitting mass entering tank 5, thereby facilitating its degassing and its subsequent separation in the centrifuge 8.

A quantity of splitting liquid, substantially corresponding to the quantity of water entering the splitting plant 1 with the sulphate soap and the sulphuric acid, is led off from the tank 12 through an outlet 15. The separated tall oil discharged from outlet 10, and which may contain 2% of water, 0.9% of lignin and 0.4% of sodium sulphate, enters a vacuum evaporation apparatus 16 having a connection 17 to a vacuum pump. Through the influence of the vacuum, the water percentage of the tall oil is reduced, for example to 0.05%, whereby lignin as well as sodium sulphate are precipitated. The tall oil thus dried is led through a pipeline 18 to a self-opening centrifuge 19, from which clean-separated tall oil discharges via an overflow outlet 20 for further treatment, such as distillation. The clean-separated tall oil, whose temperature during its passage from the splitting plant 1 to the centrifuge 19 has decreased to about 80° C through heat losses (including the evaporation heat for evaporated water) has a lignin percentage of about 0.05% and a sodium sulphate percentage of about 0.1% Lignin separated from the tall oil is discharged intermittently from the centrifuge 19, together with salts, through an outlet 21. This lignin and the lignin from the outlets 9 and 13 are collected jointly for further treatment.

The lignin percentage of 0.05% in the oil obtained according to the example is to be compared with the lignin percentage of 0.2 to 1.0% which has been obtained heretofore in conventional plants.

I claim:

1. In the treatment of tall oil which has been obtained by splitting sulphate soap with an acid and which, after removal of splitting liquid, still contains acid splitting liquid residues, the method for removing lignin from said tall oil which comprises subjecting the tall oil to a drying operation to free the tall oil from an additional quantity of splitting liquid, and thereafter mechanically separating lignin in solid form, together with an acid residue of salt crystals, from the tall oil thus dried.

2. The method of claim 1, in which said operation for drying the tall oil is carried out by vacuum evaporation.

* * * * *